United States Patent
Cleary et al.

(10) Patent No.: US 11,038,835 B2
(45) Date of Patent: Jun. 15, 2021

(54) SYSTEMS AND METHODS FOR MANAGING DOMAIN NAME INFORMATION

(71) Applicant: Comcast Cable Communications, LLC, Philadelphia, PA (US)

(72) Inventors: Paul Cleary, Turnersville, NJ (US); Rebecca Star, Philadelphia, PA (US); Luke Cori, New York, NY (US); Patrick Lee, Mountain View, CA (US); James Wakemen, Turnersville, NJ (US); Peter Cline, Minneapolis, MN (US); Nima Eskandary, Jenkintown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 385 days.

(21) Appl. No.: 15/885,299

(22) Filed: Jan. 31, 2018

(65) Prior Publication Data
US 2019/0238498 A1    Aug. 1, 2019

(51) Int. Cl.
| H04L 29/12 | (2006.01) |
| H04L 29/06 | (2006.01) |
| H04L 9/30 | (2006.01) |
| G06F 21/62 | (2013.01) |

(52) U.S. Cl.
CPC ...... *H04L 61/1511* (2013.01); *G06F 21/6218* (2013.01); *H04L 9/30* (2013.01); *H04L 29/06* (2013.01); *H04L 61/1547* (2013.01); *H04L 63/08* (2013.01); *G06F 2221/2141* (2013.01)

(58) Field of Classification Search
CPC ....... H04L 61/1511; H04L 9/30; H04L 29/06; H04L 61/1547; H04L 63/08; G06F 21/6218; G06F 2221/2141
See application file for complete search history.

(56) References Cited

U.S. PATENT DOCUMENTS

| 6,448,981 | B1 * | 9/2002 | Kaczmarski | G06F 8/38 |
| | | | | 715/763 |
| 7,143,195 | B2 * | 11/2006 | Vange | H04L 67/1029 |
| | | | | 709/249 |
| 7,558,233 | B2 * | 7/2009 | Annic | H04W 12/08 |
| | | | | 370/328 |
| 8,910,245 | B2 * | 12/2014 | Kondamuru | H04L 61/1511 |
| | | | | 726/3 |
| 9,225,734 | B1 * | 12/2015 | Hastings | H04L 63/0236 |
| 9,231,904 | B2 * | 1/2016 | Johnson | G06Q 10/103 |
| 9,781,160 | B1 * | 10/2017 | Irimie | H04L 63/1491 |
| 10,362,059 | B2 * | 7/2019 | Handa | H04L 63/105 |
| 2006/0031239 | A1 * | 2/2006 | Koenig | G06F 16/20 |

(Continued)

*Primary Examiner* — Shanto Abedin
*Assistant Examiner* — Kalu Kelly Emeaba
(74) *Attorney, Agent, or Firm* — BakerHostetler

(57) ABSTRACT

Systems and methods are described for managing DNS records. An intermediary device, such as a web portal or API, may be configured to communicate with a variety of domain name servers. The intermediary device may store authorization rules to verify commands from users to update records of the domain name servers. The authorization rules allow for users to have limited access to domain zones, domain records, domain servers, types of records, records associated with metadata, and other data. The domain name servers may store domain name records in a common data store allowing for extended searching and metadata tagging of data.

20 Claims, 7 Drawing Sheets

(56) References Cited

U.S. PATENT DOCUMENTS

| | | | |
|---|---|---|---|
| 2011/0038483 A1* | 2/2011 | Goeller | H04L 63/0807 380/282 |
| 2014/0304412 A1* | 10/2014 | Prakash | H04L 61/1511 709/226 |
| 2014/0373091 A1* | 12/2014 | Kirner | H04L 41/0893 726/1 |
| 2015/0341292 A1* | 11/2015 | Ahmed | H04L 51/18 709/206 |
| 2016/0057100 A1* | 2/2016 | Blinn | G06F 16/95 709/219 |
| 2016/0255082 A1* | 9/2016 | Rathod | H04L 51/32 726/1 |
| 2017/0017720 A1* | 1/2017 | Purusothaman | G06F 16/289 |
| 2018/0302390 A1* | 10/2018 | Beecham | H04L 63/08 |

* cited by examiner

SYSTEMS AND METHODS FOR MANAGING DOMAIN NAME INFORMATION

BACKGROUND

Cloud systems may allow users to self-manage Domain Name System (DNS) records. Administrators may have to explicitly grant access to the users via special keys. The special keys may become compromised. A compromised special key may allow a bad actor to change DNS records in devastating ways. DNS teams that do not have extensive knowledge of DNS may make errors in updating DNS records that may be difficult to troubleshoot. These and other shortcomings are addressed by the present disclosure.

SUMMARY

Systems and methods are described for managing DNS records. A computing device, such as a server, may be used as an intermediary between users and one or more domain name servers. The one or more domain name servers may have different communication requirements, such as different protocols, vendor specific commands, and/or the like. User devices may send, to the computing device, commands to manage the one or more domain servers. The commands may be authorized based on fine grained access controls, such as one or more authorization rules. An example authorization rule may associate a user identifier (e.g., or a user group identifier), a permission level (e.g., create, update, delete), and a domain record characteristic. The domain characteristics may be any set of characters (e.g., a string, such as a regular expression) that can be compared to a domain label, a domain name, a domain server, an address range, type of domain record, and/or the like. If the command satisfies the authorization rule, then the computing device may determine a domain server associated with the command and send a message (e.g., comprising the command) to the domain server according to the protocols and/or format supported by the domain server. In some scenarios, the message may be stored in a queue until the domain name server is available to process the message.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
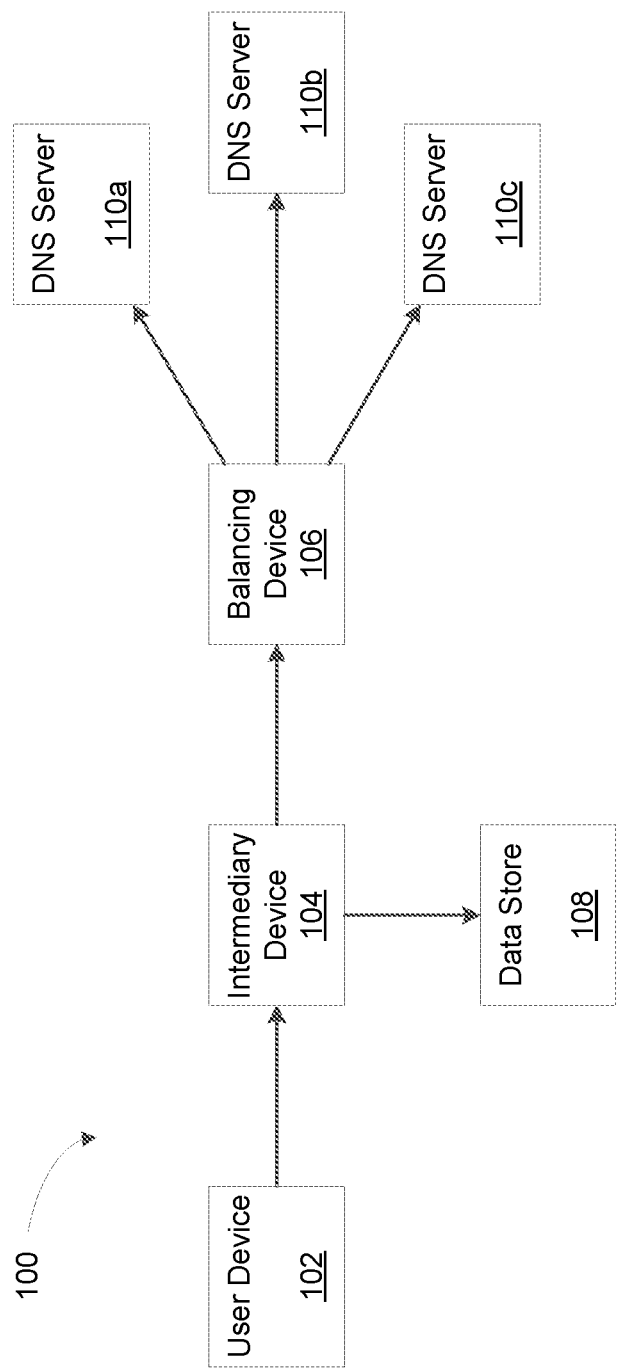
FIG. 1 is a block diagram of an example DNS management system.

Systems and methods are described for managing DNS records. The systems and/or methods may comprise a web portal for managing the DNS records. The web portal may comprise or use an application programming interface (API). The web portal may comprise a user interface. The web portal may integrate with an existing DNS infrastructure for issuing DNS updates. The web portal may act as a gateway between end users and one or more backend DNS systems. The web portal may have the ability to integrate with a plurality of types of authoritative DNS server in order to access record data and/or issue updates to records (such as creating new records, updating existing records, and deleting records).

The web portal may communicate with a plurality of DNS infrastructures, which may allow for management of a heterogeneous environment comprised of different DNS software packages. The web portal may be programmed to use a variety of different commands, functions, and/or the like associated with corresponding DNS servers (e.g., the different DNS servers may use different software to implement the domain name service).

A delay mechanism, such as a queue, may be used to throttle requests (e.g., requests to update records). The requests may be released to the DNS servers at a specified rate. An advantage of throttling requests may be a reduction in the chances of overwhelming one or more DNS servers and, therefore, a reduction in the chances of a disruption of service.

The use of fine-grained access controls (e.g., provide access controls down to the record level within a zone) to control DNS servers may allow for a new and nonconventional manner to manage DNS records. By implementing fine-grained access controls, one user may manage records that begin with "pizza" and another user may manage records that begin with "autos" in the same domain zone. Access controls may comprise record masks, record types, and contiguous Internet Protocol (IP) blocks for pointer (PTR) records in reverse zones. An advantage of fine-grained access controls may be that a user, who may need the ability to alter certain DNS records but not all DNS records, may be given a key or otherwise associated with permissions that satisfy the user's needs. In the event that the key becomes compromised, the number DNS records that are vulnerable may be limited.

An audit trail may be used to track changes, such as changes to zones and records. The audit trail may allow a user, such as an administrator, to see who changed what and when. If a user deletes a high value domain, the systems and/or methods described herein may provide information as to who made the change, when the change was made, and other logs pertaining to the event. An advantage of an audit trail may be that details of a change are preserved for later inspection.

Record tagging may be used to tag DNS records and other information with metadata. A user may associate a metadata tag with every DNS record which the user oversees that has a credit card entry form the string "credit". Example advantages of record tagging may be that management can be simplified and search can be enhanced.

Improvements to search may be achieved by storing DNS data from different DNS servers in a single data store. The use of single data store for multiple domain servers may allow DNS records across zones and servers to be searched via a single interface. In contrast, conventional systems may require a user to access different DNS servers separately to search data. Metadata tags may be associated with the records to allow efficient determination and grouping of domain related information.

Improved authentication for requests may be achieved with a public/private key signing mechanism. Public private keys may be used between the user and the web portal as well as between the web portal and the DNS servers, allowing for improvements to key management because keys between the web portal and DNS servers may be kept secret from the users so that the keys are not compromised by individual users. An advantage of authentication of requests using a public/private key signing mechanism may be that the request contents may not be modified in transit between a true client and a DNS server.

FIG. 1 is a block diagram of an example system 100. The system 100 may comprise a DNS management system. The system 100 may comprise a user device 102, an intermediary device 104, a balancing device 106, a data store 108, and one or more DNS servers 110a,b,c.

The user device 102 may be any computing device used by an end user. End users may comprise users associated with a business enterprise, such as developers, engineers, managers, etc. Different users in the business enterprise may be assigned different roles and responsibilities. Some users may manage one set of domain information (e.g., domain name records), while other users may manage a different set of domain information. Different products and/or services may be associated with different domain names. Users associated with the services and/or products may use the system 100 to manage the associated domain information. The user device 102 may comprise a computing station, a laptop, a tablet device, a mobile device (e.g., mobile phone), a smart device (e.g., smart phone), a wearable device (e.g., smart glasses, augmented reality device), and/or the like.

The intermediary device 104 may comprise one or more computing devices. The intermediary device 104 may comprise a server. The intermediary device 104 may comprise data associated with an interface. The interface may comprise a user interface, an application program interface (API), a web portal, a mobile interface, and/or the like. The intermediary device 104 may receive messages, such as a commands, requests, and/or the like. The intermediary device 104 may receive data indicative of an interaction by a user with the interface. The data indicative of the interaction may represent a command, request, or other message from a user. The interface may be configured to assist users is managing the one more DNS servers 110a,b,c.

The intermediary device 104 may be configured to restrict user device (e.g., or user) access to the one or more DNS servers 110a,b,c. The intermediary device 104 may comprise a plurality of authorization rules. Authorization rules may be associated with specific users, user groups, and/or the like. The authorization rules may restrict a user device (e.g., or user, user group) to a particular DNS server, domain, domain record, domain record type, address range, and/or the like. The authorization rules may restrict a user device based on a domain record characteristic. The domain record characteristic may comprise one or more of a type of a domain record, a domain label, a domain name, an internet protocol address range, or a metadata tag. The domain record characteristic may comprise one or more characters, such as a string or regular expression. The one or more characters may comprise command characters representing wildcard information, syntax information (e.g., lowercase, uppercase), and/or the like. The one or more characters may be matched to any data in the system, such as domain records, domain record types, zone data, address range data and/or the like. The authorization rules may be stored as a list or database of rules. The list of rules may comprise an access control list.

Access may be restricted based on one or more users and/or user groups associated with rule. A user (e.g., unique user) may belong to one or many groups. A "super user" group may have unrestricted access to all functions in in the system 100.

The access may be restricted based on an Access Control List (ACL). An ACL (e.g., or entry in the ACL) may comprise one or more of the following fields. An ACL may comprise an identifier (e.g., or name), such as a unique identifier (e.g., unique in the system) for the name of the ACL. The ACL may comprise a description, such as a short description of the reason for the ACL. The ACL may comprise one or more rules, such as one or more ACL Rules that govern access controls. The ACL may comprise a zone identifier, such as identifier for a zone if the ACL is a Zone level ACL.

An ACL may comprise one or more of rules (e.g., Access Control Rules). The one or more rules may define a set of actions permissible to a specific user or group for some set of records. A rule may comprise one or more of the following. A rule may comprise an access level, which may be indicative of actions the user is allowed to perform. An access level may comprise "none"—a level in which user cannot view or perform any action on the records. This is used in order to restrict access to certain records, while allowing access to others. The access level may comprise a "read" level—a level in which the user can view the records, but cannot edit them. The access level may comprise a "write" level—a level in which the user can view, create, and update records, but cannot delete them. An access level may comprise a "delete" level—a level in which the user can view, create, update, and delete the records. A rule may comprise a user and/or group. The user and/or group may define a single user or group to which the rule applies. If the user and/or group is not defined, the rule may be applied to all users. A rule may comprise a record mask. The record mask may comprise a regular expression used to match against a property (e.g., the name) of a record set. If a record mask is not defined, the default mask may comprise "*", which means all records. For PTR record types, CIDR rules (or * for all records) may be accepted instead of regular expressions. A rule may comprise one or more record types, such as a set of record types to which the rule applies. If not defined, the default value is "*" meaning all record types.

An ACL (e.g., and/or rule) may be specific to a DNS zone. A Zone ACL only applies to the zone for which the ACL is defined. The name of the Zone ACL may be the name of the zone itself. Management of specific ACLs may be limited to specific users. For Zone ACLs, super users and zone administrators may manage the Zone Level ACL.

In some scenarios, more than one rule may apply for a given user. Overlaps and/or conflicts can happen in various ways. A user may be referenced in different rules, and/or different ACL rules may cover the same sets of records. A rule governing access for only "A" record types may overlap with another rule governing access for "A+AAAA" record types. A rule in the ACL may exist for a specific user and one or more rules may exist for the groups of which that the user is a member.

Rule collisions (e.g., conflicting or overlapping rules) may be managed by assigning priority to different types of rules. The following business rules may be used to govern which rule is applied if overlapping ACL rules exist for the same user:

1. If the user is a super user, or the user is part of the admin group of a zone, they will have delete access regardless of any other rules in place.
2. User rules may override group rules (e.g., All/Group/User). If two rules exist for the same user, but one rule is a group level, and the other is specific to the user, the user rule may be given priority.

3. Rules with a record mask may override rules without a record mask (e.g., "*" or a more specific string of characters "www.*"). For CIDR rules, the narrowest rule may be given priority. If one rule defines a record mask of all records and another rule defines a record mask with a regular expression like "www. *", the one with a regular expression defined may be given priority. All regular expressions may be deemed equally specific, with the exception of * (e.g., all records). Boo* and b* may be considered the same level of specificity. For CIDR rules, the narrowest may be deemed most specific (e.g., and given greater priority). A rule for 10.1.2.3.4/32 may take priority over a rule for 10.0.0.0/8.
4. Rules with a record type list may override those without (*/List of types). If 2 rules overlap and both have a record mask defined, the rule that has a record type list (if defined) may be used. Smaller lists may have priority over longer lists (ex. [A, AAAA] is more specific than [CNAME, A, MX]).
5. The most restrictive rule may be given priority. If the previous rules fail to net a single rule that can be used, the rule that is most restrictive, which is the rule that allows the fewest permissions, may be used.

Management of priority among rules is explained as follows. Overlapping rules may match for the same user. A rule may exist for group "level2-support" granting read-only permissions to all records in zone "people.com". A rule may exist named "jack-acl" for user "jack" granting read-write permissions for all records in zone "people.com". User "jack" may be a member of the "level2-support" group. The result is that jack may be allowed read-write access to people.com because the user specific rule overrides the less specific group rule.

Overlapping rules may match for the same user with different record types. A rule may exist for the group "level2-support" granting read-write permissions to all records in zone "people.com." A rule may exist for the group "level2-support" granting "read-only" permissions for record types NS and SOA in zone "people.com." User "jack" may be a member of the "level2-support" group. The result is that jack may be allowed read-only access to NS and SOA records in people.com because the rule is specific to those record types. Jack may be allowed read-write access to all other record types, e.g. "A, AAAA, CNAME, etc."

Overlapping rules may match for the same user with different record masks. A rule may exist for the group "level2-support" granting read-write permissions to all records in zone "people.com." A rule may exist for the group "level2-support" granting read-write-delete permissions to records matching the expression "www.*" in zone "people.com". User "jack" may be a member of the "level2-support" group. The result is that jack may be allowed read-write-delete access to records that start with "www". Jack may also be allowed read-write access to records other records that do not start with "www."

Overlapping rules may have the same specificity. A rule may exist for the group "level2-support" granting read-write permissions to all records in zone "people.com". A rule may exist for the group "level2-support" granting read-only permissions to all records in zone "people.com". User "jack" may be a member of the "level2-support" group. The result may be that jack is allowed read-only access to all records in people.com because we choose the more restrictive rule as a last resort.

Two conflicting rules may exist in which rule 1 is more specific in audience, and rule two is more specific in record mask. Rule 1 may specify Jack (user)/Read-Write (access level)/Records: * (record mask)/Record types: * (record type). Rule 2 may specify GroupWithJack (group and user)/Read-Only (access level)/Records: www.* (record mask)/Record types: *(record type). The result may be that Jack may be allowed read-write access because choose the more specific user access is given priority over record info Two rules may conflict in which rule 1 is more specific in record mask, and rule 2 is more specific in record types. Rule 1 may specify Jack (user)/Read-Write (access level)/Records: * (record mask)/Record types: A, AAAA (record type). Rule 2 may specify Jack (user)/Read-Only (access level)/Records: www.* (record mask)/Record types: * (record type). The result may be that Jack is allowed read-only access because the more specific record mask is given priority over considering record types.

The intermediary device 104 may receive a DNS message from the user device 102. The DNS message may be associated with any data associated with the system 100, such as a request or command associated with one or more DNS servers 110a,b,c. The intermediary device 104 may determine if a user associated with the user device 102 is authorized to send the DNS message. The intermediary device 104 may enforce one or more authorization rules applicable to the user associated with the user device 102. The intermediary device 104 may enforce one or more authorization rules applicable to groups associated with the user associated with the user device 102. Some authorization rules may have priority over other authorization rules. An authorization rule specific to a user may be given priority over an authorization rule associated with a group with which the user is associated. A user group associated with the user may only have permission to read domain records for a particular zone. If the user has permission to update or delete records of the zone, then commands from the user to update or delete records of the zone may be authorized.

The intermediary device 104 may determine which DNS server of the one or more DNS servers 110a,b,c is appropriate to receive the DNS message. The DNS message may specify the DNS server. The DNS message may specify a DNS zone, DNS record, and/or other information. The DNS zone, DNS record, and/or other information may be used to determine to which of the one or more DNS servers 110a, b,c, the DNS message is directed. The interface of the intermediary server 104 may be configured to present a list of available commands to the user. The user device may login to the interface. The intermediary device 104 may determine which DNS records, DNS record types, DNS zones, commands, DNS servers, and/or the like are available to the user (e.g., and corresponding permission levels). Thus, the user may only be able to select commands in the interface which are authorized to the user.

The DNS message may comprise a hypertext transfer protocol (HTTP) message. The DNS message may comprise JSON data. The user device 102 may communicate with the intermediary device 104 using HTTP (e.g., via CURL). The DNS message may be formatted based on one or more client libraries supported by the intermediary server 104. The intermediary server 104 may support client libraries for several different languages, such as ruby, java, python, and go-lang. The client libraries may be configured to facilitate request signing (e.g., to make API calls simpler).

An example DNS message may create (e.g., or update) a record set in a specified zone. The DNS message may comprise an HTTP request comprising "POST/zones/{zoneId}/recordsets", where zoneId indicates a zone identifier of a zone where the record set belongs. The DNS message may comprise request parameters, such as the zoneId, a name of the recordset being updated, a type of the recordset, a time to live value, and record data (e.g., an array of record data) for the record set. A create request may comprise the following fields with example data as follows: "name: test", "type: A", "ttl: 300", "records: [{address: 10.10.10.10}]", and "zoneID: 2467dc05-68eb-4498-a9d5-78d24bb0893c". An example DNS message may be configured to delete a record set. The DNS message may comprise an HTTP request comprising "DELETE/zones/{zoneId}/recordsets/{recordSetId}", where zoneId comprises a zone identifier and recordSetId comprises an identifier of a record set.

The intermediary server 104 may be configured to respond with a variety of messages. An example response message may indicate the DNS message is accepted (e.g., the request is valid and has been accepted for processing; the record set change resource is returned in the response body), a bad request (e.g., the zone being updated is not active; typically because the connection information does not exist for the zone), unauthorized (e.g., The authentication information provided is invalid, typically the request was not signed properly, or the access key and secret used to sign the request are incorrect), forbidden (e.g., The user does not have the access required to perform the action), not found (e.g., zone or recordset not found), conflict (e.g., there is an existing pending change against this zone), and/or the like. The response from the intermediary server 104 may comprise one or more attributes, such as a zone (e.g., a map comprising information about the zone when the request was performed, a record set (e.g., model of the record set), a user identifier (e.g., user identifier associated with the request), a change type (e.g., type of change requested, such as create, update, delete), a time stamp (e.g., time of processing request, an identifier (e.g., identifier of the action performed).

The intermediary device 104 may be configured to implement security functionality, such as encryption, a public-private key system, and/or the like. The intermediary device 104 may manage public/private keys associated with the user device 102. One or more keys may be generated for each user (e.g., or user device, user group). The one or more keys may comprise a public-private key pair. The public-private key pair may comprise a private key (e.g., managed by the user, stored on the user device). The public key may be managed by the intermediary device 104. The DNS message may have been encrypted, based on the private key associated with the user, by the user device 102 using a first public/private key signing mechanism. The DNS message may be decrypted by the intermediary device 104 using the first public/private key signing mechanism. The intermediary device may use the public key associated with the user device to decrypt the DNS message.

The intermediary device 104 may manage public/private keys used by the DNS servers 110a,b,c. The public/private keys used by the DNS services 110a,b,c may be kept private from one or more of the users. If the received DNS message is authorized, the intermediary device 104 may generate a message for one or more of the DNS servers 110a,b,c. The intermediary device 104 may translate the received DNS message in to a format supported by the corresponding DNS servers 110a,b,c. The received DNS message may be translated into a DNS protocol message, a proprietary protocol and/or command (e.g., specific to a server software package). In some cases, multiple DNS messages may be generated based on a single received DNS message. The DNS message for the one or more DNS servers 110a,b,c may be encrypted by the intermediary device 104 using a second public/private key signing mechanism. The public and/or private key used to encrypt the message to the DNS server may be associated with (e.g., or specific to) a DNS server, a DNS zone, a DNS record, a DNS record, a DNS address range and/or the like.

The intermediary device 104 may be configured to send (e.g., transfer, transmit, forward, etc.) the DNS message to a balancing device 106. The balancing device 106 may comprise one or more computing devices. The intermediary device 104 and the balancing device 106 may reside on the same one or more computing devices. The intermediary device 104 and the balancing device 106 may be local to each other (e.g., in communication via a local area network). The intermediary device 104 and the balancing device 106 may be remote from each other. The balancing device 106 may comprise a queue. The queue may comprise DNS messages. The balancing device 106 may determine which DNS server of the one or more DNS servers 110a,b,c is appropriate to receive the DNS message. The balancing device 106 may send (e.g., transfer, transmit, forward, etc.) the DNS messages to appropriate DNS servers 110a,b,c at one or more predetermined rates. Each of the DNS servers 110a,b,c may have a different message processing rate. The balancing device 106 may be configured to enforce the corresponding message processing rate for each of the DNS servers 110a,b,c. The balancing device 106 may send the DNS messages to the corresponding DNS servers 110a,b,c in accordance with the corresponding message processing rates.

The system 100 may comprise a data store 108. The data store may comprise a centralized data storage container (e.g., physical or virtual container). The data store may comprise a single database (e.g., or collection of associated databases). The data store 108 may store the data for all (e.g., or a portion) of the DNS servers 110a,b,c. The data may comprise the DNS records and associated data managed by each DNS server. A different table in the database may be used for each of the DNS servers 110a,b,c. The intermediary device 104 may store the received DNS message, generate DNS messages, and/or the like in the data store 108. The data store 108 may comprise one or more computing devices. The intermediary device 104 and the data store 108 may reside on the same one or more computing devices. The intermediary device 104 and the data store 108 may be local to each other. The intermediary device 104 and the data store 108 may be remote from each other. The data store 108 may comprise data managed by the intermediary device 104, such as user information, keys, user groups, authorization rules, metadata (e.g., tags), and/or the like.

The records in the data store 108 may be searched. The records in the data store 108 may be searched by metadata, domain name, domain label, domain type, and/or the like. The data store 108 may be configured to store historical information, such as a log of transactions. The historical information may comprise the user that sent DNS message, the DNS message, a timestamp, a copy of domain data (e.g., a domain record) before the DNS message was implemented, a copy of the data after the DNS message was implemented, and/or the like.

The intermediary device 104 may be configured to associate metadata with any kind of information stored in the data store. Certain domain records, DNS servers, users, user groups, historical information, authorization rules, and/or the like. Metadata, such as a metadata tag, may be used in an authorization rules. The authorization rule may specify that a user is able to modify any record associated with the metadata tag.

etadata may be used to facilitate searching for DNS records across zones. A single virtual machine (e.g., or computing device) may comprise records in different DNS zones, such as a forward zone, an IP4 reverse zone, and an IP6 reverse zone. An A record and AAAA record in a forward zone, a PTR record in an IP4 reverse zone, and another PTR records in an IP6 reverse zone. Metadata may be associated with records in one or more of the different DNS zones. All records stored on a single virtual machine may be associated with a metadata tag (e.g., a tag indicative of the virtual machine). This association allows a user to quickly find all records across all zones for the same machine.

A DNS server 110a,b,c may comprise one or more computing devices. The DNS servers 110a,b,c may comprise authoritative DNS servers. In some implementations the DNS servers 110a,b,c may comprise authoritative only DNS servers. In other implementations, the DNS servers 110a,b,c, may comprise any type of DNS server, such as a master (e.g., primary) DNS Server, a slave (e.g., secondary) DNS Server, a caching DNS Server, a DNS resolver, a forwarding DNS Server, a stealth (e.g., DMZ or hidden master) DNS Server, and/or the like.

A DNS server 110a,b,c may resolve (e.g., translate, etc.) Universal Resource Locator (URL) addresses to IP addresses. The resolution (e.g., translation, etc.) of URL addresses to IP addresses may be performed according to records (e.g., or rules) residing on the one or more DNS servers 110a,b,c. The DNS message may comprise instructions to alter the records. One or more of the DNS servers 110a,b,c may receive the DNS message from the balancing device 106. The DNS message may be decrypted by the appropriate DNS server using the second public/private key signing mechanism. The appropriate DNS server may execute the instructions indicated by the DNS message.

A manager may assign a particular team member to maintain a particular subset of DNS records, such as any DNS record that comprises "pizza". The manager may assign a particular user identifier to the particular user. The manager may receive a particular user identifier from the particular user and record the particular user identifier. The particular user may access a web portal hosted on an intermediary device 104 through a user device 102. The particular user may provide the particular user identifier to the intermediary device 104 through the user device 102. The particular user may send a DNS message to the intermediary device 104 through the user device 102. The user device 102 may encrypt the DNS message using a public/private key mechanism. The DNS message may be a request to alter a current DNS record. The intermediary device 104 may decrypt the DNS message using a public/private key mechanism. The intermediary device 104 may determine whether the particular user has permission to send the DNS message. If the particular user does not have permission to send the DNS message, then the intermediary device 104 may cause the user device 102 to display an error message and ignore the DNS message. If the DNS message is associated with a DNS record that does not comprise "pizza", the intermediary device 104 may display an error message to the user device 102 and ignore the DNS message. If the particular user does have permission to send the DNS message, then the intermediary device 104 may proceed. If the DNS message is associated with a DNS record that comprises "pizza", the intermediary device 104 may proceed. The DNS message may comprise a command to update IP address associated with "www.myfakepizzasite.com" and add "redirect" to the metadata associated with the DNS record. The intermediary device 104 may encrypt the DNS message using a public/private key mechanism. The intermediary device 104 may provide the DNS message to a balancing device 106. The balancing device 106 may comprise a queue and may place the DNS message in the end of the queue. The balancing device 106 may provide DNS messages to DNS servers 110a,b,c at a predetermined rate. The balancing device 106 may provide the DNS message to an appropriate DNS server. The appropriate DNS server may decrypt the DNS message using a public/private key mechanism. The appropriate DNS server may execute instructions in accordance with the DNS message. As part of historical information, such as transaction log, the intermediary device 104 may store the DNS record, the DNS message, the user identifier, the user associated with the user identifier, a timestamp, the like and/or any combination of the foregoing to a data store 108. The intermediary device 104 may provide a subset of the DNS record, the DNS message, the user identifier, the user associated with the user identifier, a timestamp, the like and/or any combination of the foregoing to a data store 108 and the data store 108 may derive (e.g., retrieve, compute, generate, etc.) one or more other attributes. The intermediary device 104 may provide the data store 108 with the updated IP address for the DNS record associated with "www.myfakepizzasite.com", the particular user identifier, and metadata. The data store 108 may generate a timestamp and update information associated with the DNS record based on the provided information and the timestamp. The particular user may search for DNS records with "redirect" in metadata using the user device 102 in communication with the intermediary device 104. The intermediary device 104 may search the data store 108 for DNS records with "redirect" in metadata. The intermediary device 104 may cause the DNS record associated with "www.myfakepizzasite.com" to be displayed on the user device 102.

Figure 2:
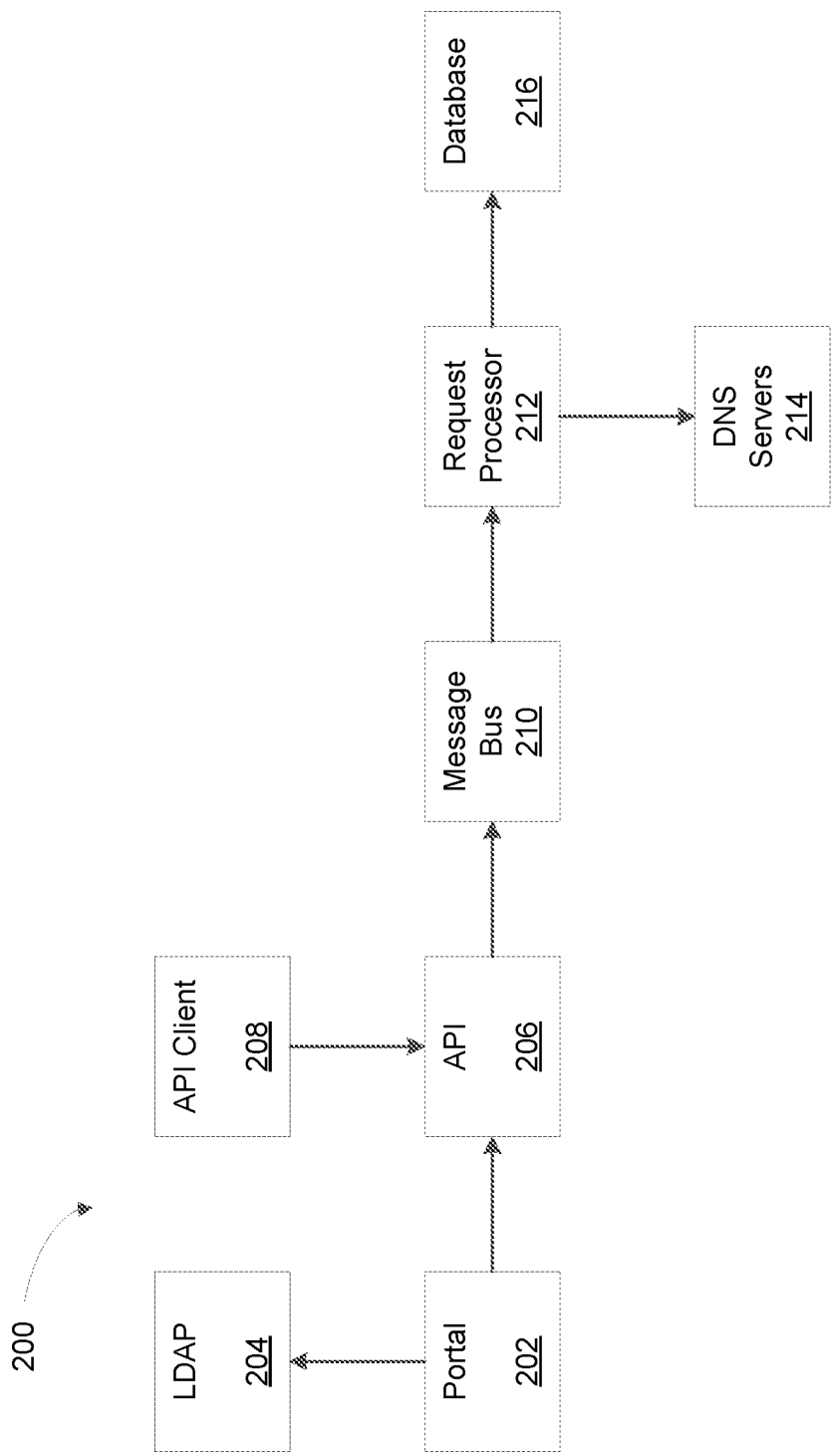
FIG. 2 is a block diagram of an example DNS management system.

FIG. 2 is a block diagram of an example DNS management system 200. The DNS management system 200 may comprise a portal 202. From the portal 202, authentication to a user interface may be performed by a Lightweight Directory Access Protocol (LDAP) 204. The portal 202 may access an API 206. The portal 202 may access the API 206 via Hypertext Transfer Protocol Secure (HTTPS). The portal 202 may use the API 206 to authorize information accessed from a database 216. The portal may use the API 206 to create a DNS message. The DNS message may be signed using a public/private key mechanism. The DNS message may comprise creating a DNS record, deleting a DNS record, altering a DNS record, creating a DNS zone, deleting DNS zone, altering a DNS zone, etc.

An API client 208 may be any system configured to communicate with the API 206. An API client 208 may be a system (e.g., program, etc.) that manages DNS records when a new virtual machine is created and/or destroyed. The API 206 may send DNS messages received from the portal 202 to a request processor 212 via a message bus 210. The message bus 210 may comprise a queue. The queue may comprise a plurality of DNS messages. The queue may release DNS messages to the request processor 212 at a predetermined rate. The request processor 212 may send (e.g., transmit, etc.) the DNS message to one or more DNS servers 214. The request processor 212 may send (e.g., transmit, etc.) the DNS message to the database 216.

Figure 3:
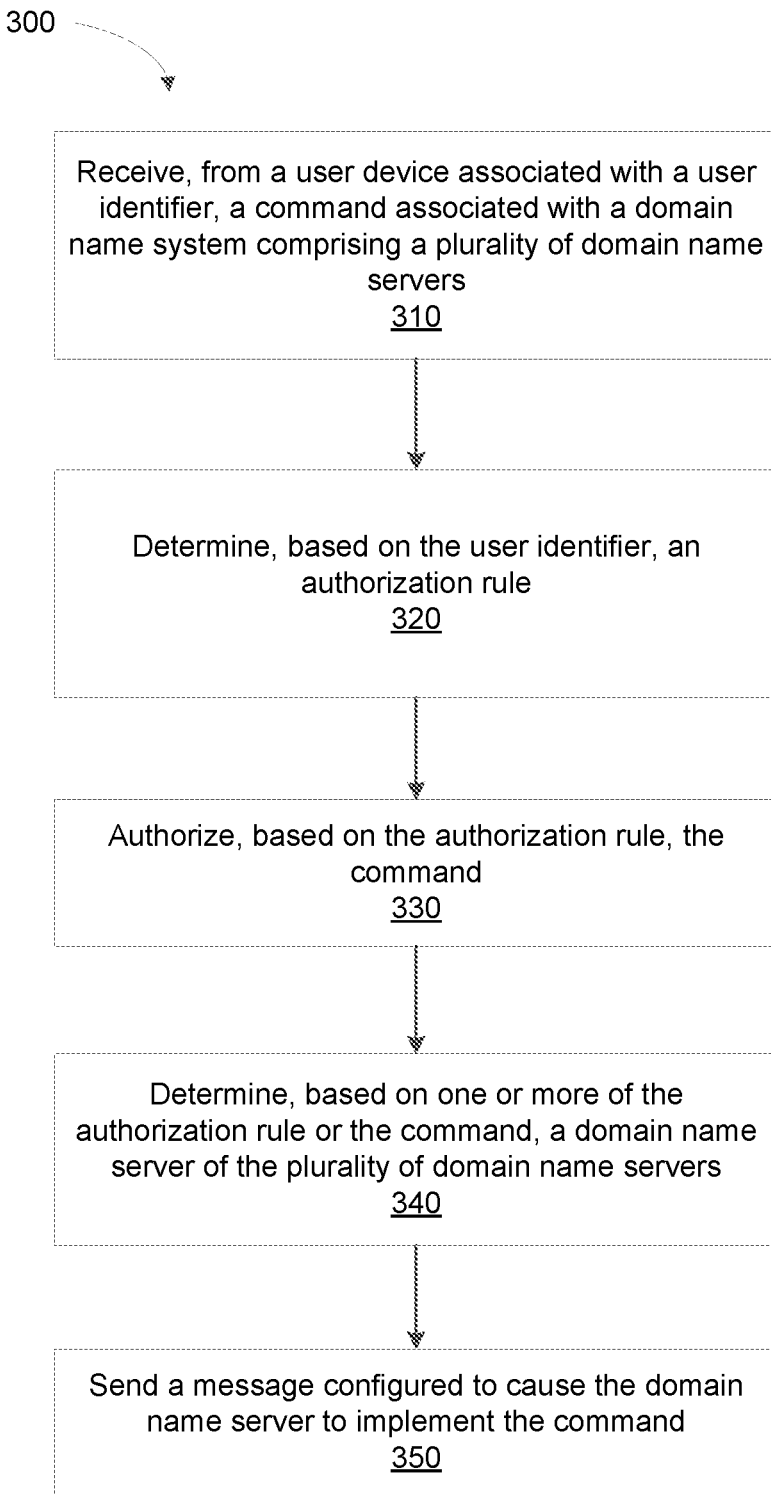
FIG. 3 is a flow diagram of an example method.

FIG. 3 is a flow diagram of an example method 300 for managing DNS records. A command may be received from a user device associated with a user identifier at step 310. The intermediary device 104 in FIG. 1 may receive a command from user device 102 in FIG. 1 associated with a user identifier. The command may be associated with a domain name system. The domain name system may comprise a plurality of domain name servers. The domain name system may comprise DNS servers 110a,b,c in FIG. 1.

The user identifier may comprise a private key associated with a user. One or more of the command or the user device may be authenticated based on the private key and a public key associated with the user. The command may comprise an update to a domain name record. The plurality of domain servers may comprise a first domain server associated with a first domain name server package. The plurality of domain servers may comprise a second domain server associated with a second domain name server package. The second domain name server package may be different from the first domain name server package. The first domain name server may be configured to store data in a data store. The second domain name server may be configured to store data in the data store. The authorization rule may be stored in the data store. The command may comprise a search command for searching at least a portion of the data store. The command may be received by a first device via one or more of a portal or an application programming interface. The domain name system may comprise an authoritative domain name server configured to manage one or more domain name zones.

At step 320, an authorization rule may be determined based on the user identifier. The intermediary device 104 in FIG. 1 may determine an authorization rule based on the user identifier. The authorization rule may associate the user identifier with data indicative of one or more of the plurality of domain name servers. The authorization rule may associate the user identifier with a permission level and/or a domain record characteristic. The permission level may comprise a file system privilege level. The file system privilege level may comprise one of a read privilege, a write privilege, a delete privilege, or a combination thereof. The domain record characteristic may comprise one or more of a type of a domain record, a domain label, a domain name, an internet protocol address range, or a metadata tag.

At step 330, the command may be authorized based on the authorization rule. The intermediary device 104 in FIG. 1 may authorize the command based on the authorization rule. The authorization rule may comprise one or more characters indicative of the domain record characteristic. A determination may be made that a domain record specified by the command satisfies a matching criterion applied to the one or more characters. The matching criterion may specify matching of the one or more characters to one or more of a domain name zone, a domain name record, a domain label, an internet protocol address range, or a metadata tag.

At step 340, a domain name server of the plurality of domain name servers may be determined based on one or more of the authorization rule or the command. The intermediary device 104 in FIG. 1 may determine a DNS server of the one or more DNS servers 110a,b,c based on one or more of the authorization rule or the command. The authorization rule used to authorize the command may associate a user identifier with the DNS server. The command may indicate the DNS server.

At step 350, a message configured to cause the domain name server to implement the command may be sent. The intermediary device 104 in FIG. 1 and/or balancing device 106 in FIG. 1 may send a message configured to cause the DNS server to implement the command. One or more of the command or the message may be caused to be inserted into a queue. Balancing device 106 in FIG. 1 may cause one or more of the command or the message to be inserted into a queue. The message may be sent from the queue to the domain name server. Balancing device 106 in FIG. 1 may send the message from the queue to the DNS server. The message may be sent based on a processing rate associated with the DNS server. Balancing device 106 in FIG. 1 may send the message based on a processing rate associated with the domain name server. The message may be sent based on a domain name server protocol. Balancing device 106 in FIG. 1 may send the message based on a domain name server protocol.

A private key assigned to a user of the user device may be received from the user device. The intermediary device 104 in FIG. 1 may receive a private key assigned to a user of user device 102 in FIG. 1 from user device 102 in FIG. 1. The user identifier may be determined based on the private key and an associated public key. The intermediary device 104 in FIG. 1 may determine the user identifier based on the private key and an associated public key. An association of the command, the user identifier, and a time associated with the command may be stored as part of a history associated with the domain name server. The intermediary device 104 in FIG. 1 may store an association of the command, the user identifier, and a time associated with the command as part of a history associated with the domain name server in data store 108 in FIG. 1.

A manager may assign a particular team member to maintain a particular subset of DNS records, such as any DNS record that comprises "pizza". The manager may assign a particular user identifier to the particular user. The manager may receive a particular user identifier from the particular user and record the particular user identifier. The particular user may access a web portal hosted on an intermediary device through a user device. The particular user may provide the particular user identifier to the intermediary device through the user device. The particular user may provide a command to the intermediary device through the user device. The user device may encrypt the command using a public/private key mechanism. The command may be a request to alter a current DNS record. The intermediary device may decrypt the command using a public/private key mechanism. The intermediary device may determine whether the particular user has permission to send the command. If the particular user does not have permission to send the command, then the intermediary device may cause the user device to display an error message and ignore the command. If the command is associated with a DNS record that does not comprise "pizza", the intermediary device may display an error message to the user device and ignore the command. If the particular user does have permission to send the command, then the intermediary device may proceed. If the command is associated with a DNS record that comprises "pizza", the intermediary device may proceed. The command may comprise updating an IP address to a DNS record associated with "www.myfakepizzasite.com" and adding "redirect" to the metadata associated with the DNS record. The intermediary device may create (e.g., generate, etc.) a message indicative of the instructions in the command. The intermediary device may encrypt the message using a public/private key mechanism. The intermediary device may provide the message to a queue. The message may be placed in the end of the queue. The queue may provide messages to a plurality of domain name servers at a predetermined rate. The queue may provide the message to an appropriate domain name server. The appropriate domain name server may decrypt the message using a public/private key mechanism. The appropriate domain name server may execute instructions in accordance with the message. The intermediary device may provide the DNS record, the command and/or the message, the user identifier, the user associated with the user identifier, a timestamp, the like and/or any combination of the foregoing to a data store. The intermediary device may provide a subset of the DNS record, the command and/or the message, the user identifier, the user associated with the user identifier, a timestamp, the like and/or any combination of the foregoing to a data store, and the data store may derive (e.g., retrieve, compute, generate, etc.) one or more other attributes. The intermediary device may provide the data store with the updated IP address for the DNS record associated with "www.myfakepizzasite.com", the particular user identifier, and metadata, and the data store may generate a timestamp and update information associated with the DNS record based on the provided information and the timestamp. The particular user may search for DNS records with "redirect" in metadata using the user device in communication with the intermediary device. The intermediary device may search the data store for DNS records with "redirect" in metadata. The intermediary device may cause the DNS record associated with "www.myfakepizzasite.com" to be displayed on the user device.

Figure 4:
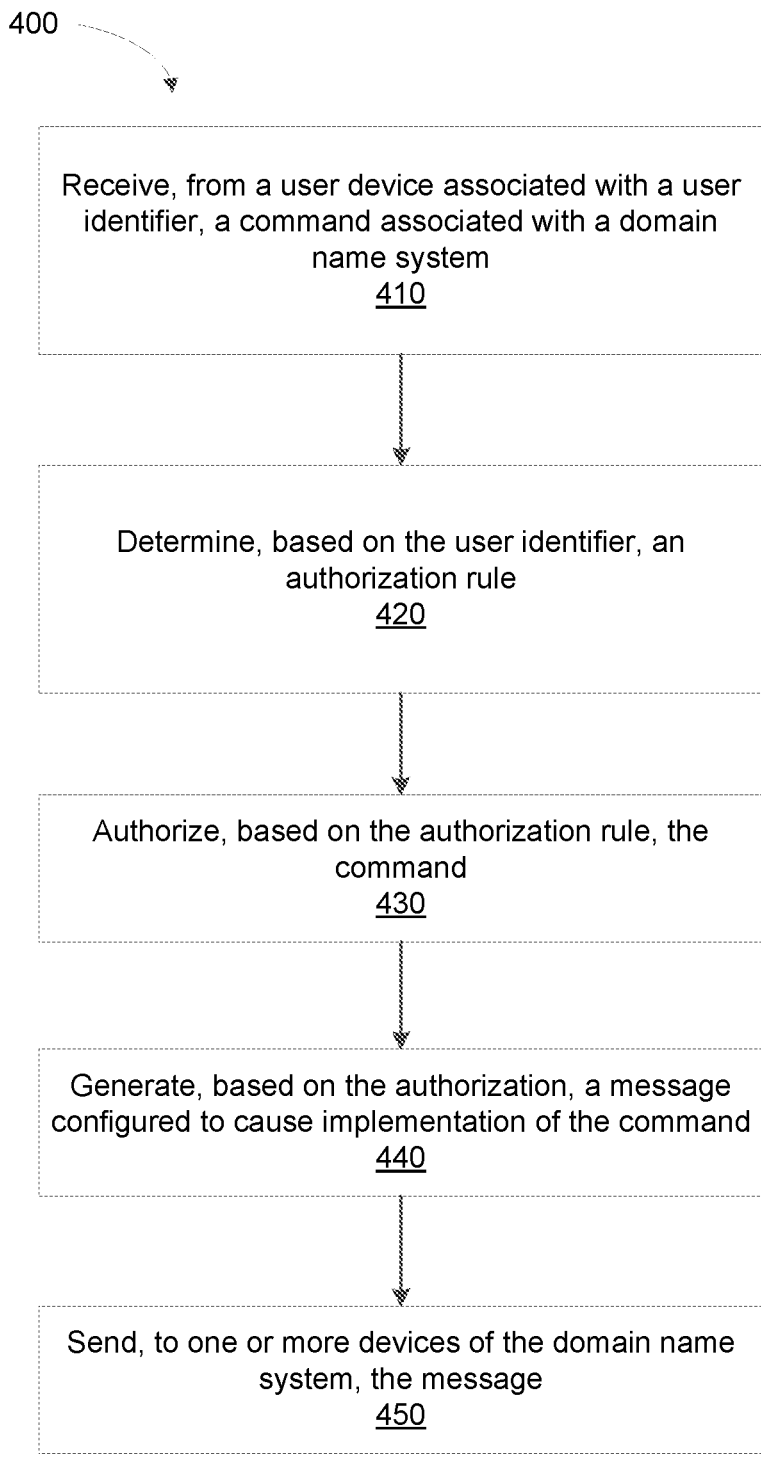
FIG. 4 is a flow diagram of an example method.

FIG. 4 is a flow diagram of an example method 400 for managing DNS records. A command may be received from a user device associated with a user identifier at step 410. The intermediary device 104 in FIG. 1 may receive a command from user device 102 in FIG. 1 associated with a user identifier. The command may be associated with a domain name system.

The user identifier may comprise a private key associated with a user. One or more of the command or the user device may be authenticated based on the private key and a public key associated with the user. The command may comprise an update to a domain name record. The domain name system may comprise a first domain server associated with a first domain name server package. The domain name system may comprise a second domain server associated with a second domain name server package. The second domain name server package may be different from the first domain name server package. The first domain server may be configured to store data in a data store. The second domain server may be configured to store data in the data store. The authorization rule may be stored in the data store. The command may comprise a search command for searching at least a portion of the data store. The command may be received by a first device via one or more of a portal or an application programming interface. The one or more devices of the domain name system may comprise an authoritative domain name server configured to manage one or more domain name zones.

At step 420, an authorization rule may be determined based on the user identifier. The intermediary device 104 in FIG. 1 may determine an authorization rule based on the user identifier. The authorization rule may associate the user identifier with a domain record characteristic. The authorization rule may associate the user identifier with a permission level. The permission level may comprise a file system privilege level. The file system privilege level may comprise one of a read privilege, a write privilege, a delete privilege, or a combination thereof. The domain record characteristic may comprise one or more of a type of a domain record, a domain label, a domain name, an internet protocol address range, or a metadata tag.

At step 430, the command may be authorized based on the authorization rule. The intermediary device 104 in FIG. 1 may authorize the command based on the authorization rule. The authorization rule may comprise one or more characters indicative of the domain record characteristic. A determination may be made that a domain record specified by the command satisfies a matching criterion applied to the one or more characters. The matching criterion may specify matching of the one or more characters to one or more of a domain name zone, a domain name record, a domain label, an internet protocol address range, or a metadata tag.

At step 440, a message configured to cause implementation of the command may be generated based on the authorization in step 430. The intermediary device 104 in FIG. 1 may generate a message configured to cause implementation of the command on one DNS server of the one or more DNS servers 110a,b,c in FIG. 1.

At step 450, the message may be sent to one or more devices of the domain name system. The intermediary device 104 in FIG. 1 and/or balancing device 106 in FIG. 1 may send the message to one or more DNS servers 110a,b,c in FIG. 1. One or more of the command or the message may be caused to be inserted into a queue. Balancing device 106 in FIG. 1 may cause one or more of the command or the message to be inserted into a queue. The message may be sent from the queue to the one or more devices. Balancing device 106 in FIG. 1 may send the message from the queue to the DNS server. The message may be sent based on a processing rate associated with the one or more devices. Balancing device 106 in FIG. 1 may send the message based on a processing rate associated with the DNS server. The message may be sent based on a domain name server protocol. Balancing device 106 in FIG. 1 may send the message based on a domain name server protocol.

A private key assigned to a user of the user device may be received from the user device. The intermediary device 104 in FIG. 1 may receive a private key assigned to a user of user device 102 in FIG. 1 from user device 102 in FIG. 1. The user identifier may be determined based on the private key and an associated public key. The intermediary device 104 in FIG. 1 may determine the user identifier based on the private key and an associated public key. An association of the command, the user identifier, and a time associated with the command may be stored as part of a history associated with the domain name system. The intermediary device 104 in FIG. 1 may store an association of the command, the user identifier, and a time associated with the command as part of a history associated with the domain name system in data store 108 in FIG. 1.

A manager may assign a particular team member to maintain a particular subset of DNS records, such as any DNS record that comprises "pizza". The manager may assign a particular user identifier to the particular user. The manager may receive a particular user identifier from the particular user and record the particular user identifier. The particular user may access a web portal hosted on an intermediary device through a user device. The particular user may provide the particular user identifier to the intermediary device through the user device. The particular user may provide a command to the intermediary device through the user device. The user device may encrypt the command using a public/private key mechanism. The command may be a request to alter a current DNS record. The intermediary device may decrypt the command using a public/private key mechanism. The intermediary device may determine whether the particular user has permission to send the command. If the particular user does not have permission to send the command, then the intermediary device may cause the user device to display an error message and ignore the command. If the command is associated with a DNS record that does not comprise "pizza", the intermediary device may display an error message to the user device and ignore the command. If the particular user does have permission to send the command, then the intermediary device may proceed. If the command is associated with a DNS record that comprises "pizza", the intermediary device may proceed. The command may comprise updating an IP address to a DNS record associated with "www.myfakepizzasite.com" and adding "redirect" to the metadata associated with the DNS record. The intermediary device may create (e.g., generate, etc.) a message indicative of the instructions in the command. The intermediary device may encrypt the message using a public/private key mechanism. The intermediary device may provide the message to a queue. The message may be placed in the end of the queue. The queue may provide messages to a plurality of domain name servers at a predetermined rate. The queue may provide the message to an appropriate domain name server. The appropriate domain name server may decrypt the message using a public/private key mechanism. The appropriate domain name server may execute instructions in accordance with the message. The intermediary device may provide the DNS record, the command and/or the message, the user identifier, the user associated with the user identifier, a timestamp, the like and/or any combination of the foregoing to a data store. The intermediary device may provide a subset of the DNS record, the command and/or the message, the user identifier, the user associated with the user identifier, a timestamp, the like and/or any combination of the foregoing to a data store, and the data store may derive (e.g., retrieve, compute, generate, etc.) one or more other attributes. The intermediary device may provide the data store with the updated IP address for the DNS record associated with "www.myfakepizzasite.com", the particular user identifier, and metadata, and the data store may generate a timestamp and update information associated with the DNS record based on the provided information and the timestamp. The particular user may search for DNS records with "redirect" in metadata using the user device in communication with the intermediary device. The intermediary device may search the data store for DNS records with "redirect" in metadata. The intermediary device may cause the DNS record associated with "www.myfakepizzasite.com" to be displayed on the user device.

Figure 5:
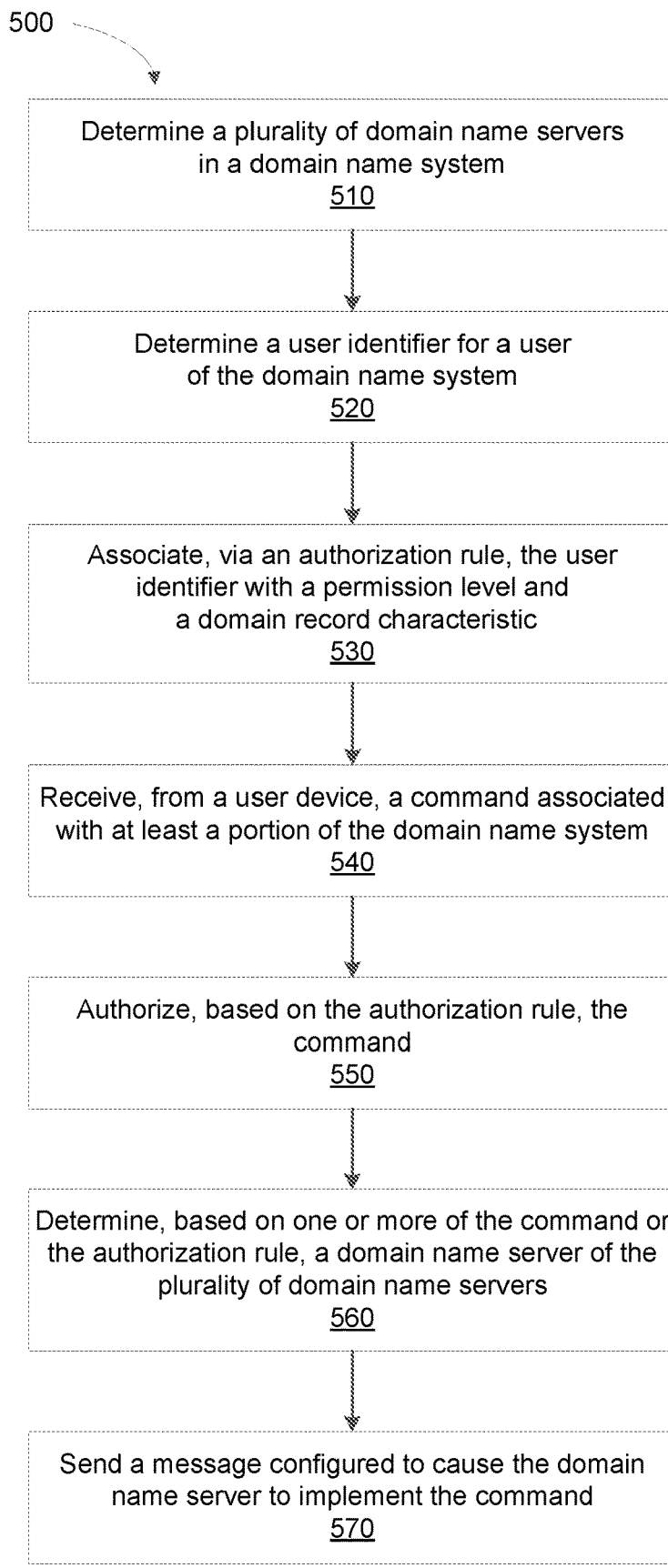
FIG. 5 is a flow diagram of an example method.

FIG. 5 is a flow diagram of an example method 500 for managing DNS records. A plurality of domain name servers may be determined in a domain name system at step 510. The intermediary device 104 in FIG. 1 may determine a plurality of DNS servers 110a,b,c in a domain name system. The plurality of domain name servers may comprise a first domain server associated with a first domain name server package. The plurality of domain name servers may comprise a second domain server associated with a second domain name server package. The second domain name server package may be different from the first domain name server package. The first domain server may be configured to store data in a data store. The second domain server may be configured to store data in the data store. The domain name system may comprise an authoritative domain name server configured to manage one or more domain name zones.

At step 520, a user identifier for a user of the domain name system may be determined. The intermediary device 104 in FIG. 1 may determine a user identifier for a user of the domain name system. The user identifier may comprise a private key associated with the user. One or more of the command or the user device may be authenticated based on the private key and a public key associated with the user. The domain name system may comprise an authoritative domain name server configured to manage one or more domain name zones.

At step 530, the user identifier may be associated with a permission level and a domain record characteristic via an authorization rule. The intermediary device 104 in FIG. 1 may associate, via an authorization rule, the user identifier with a permission level and a domain record characteristic. The permission level may comprise a file system privilege level. The file system privilege level may comprise one of a read privilege, a write privilege, a delete privilege, or a combination thereof. The domain record characteristic may comprise one or more of a type of a domain record, a domain label, a domain name, an internet protocol address range, or a metadata tag. The authorization rule may comprise one or more characters indicative of the domain record characteristic. The authorization rule may be stored in the data store.

At step 540, a command associated with at least a portion of the domain name system may be received from a user device. The intermediary device 104 in FIG. 1 may receive a command associated with at least a portion of the domain name system from user device 102 in FIG. 1. The command may comprise an update to a domain name record. The command may comprise a search command for searching at least a portion of the data store. The command may be received by a first device and via one or more of a portal or an application programing interface.

At step 550, the command may be authorized based on the authorization rule. The intermediary device 104 in FIG. 1 may authorize the command based on the authorization rule. A domain record specified by the command may be determined to satisfy a matching criterion applied to the one or more characters. The matching criterion may specify matching of the one or more characters to one or more of a domain name zone, a domain name record, a domain label, an internet protocol address range, or a metadata tag.

At step 560, a domain name server of the plurality of domain name servers may be determined based on one or more of the command or the authorization rule. The intermediary device 104 in FIG. 1 may determine a DNS server of the one or more DNS servers 110a,b,c based on one or more of the command or the authorization rule. The authorization rule used to authorize the command may associate a user identifier with the DNS server. The command may indicate the DNS server.

At step 570, a message configured to cause the domain name server to implement the command may be sent. The intermediary device 104 in FIG. 1 and/or balancing device 106 in FIG. 1 may send a message configured to cause the DNS server to implement the command. One or more of the command or the message may be caused to be inserted into a queue. The intermediary device 104 in FIG. 1 and/or balancing device 106 in FIG. 1 may cause one or more of the command or the message to be inserted into a queue. The message may be sent from the queue to the domain name server and based on a processing rate associated with the domain name server. The intermediary device 104 in FIG. 1 and/or balancing device 106 in FIG. 1 may send the message from the queue to the DNS server and based on a processing rate associated with the DNS server. The message may be sent based on a domain name server protocol. The intermediary device 104 in FIG. 1 and/or balancing device 106 in FIG. 1 may send the message based on a domain name server protocol.

A private key assigned to a user of the user device may be received from the user device. The intermediary device 104 in FIG. 1 may receive a private key assigned to a user of user device 102 in FIG. 1 from user device 102 in FIG. 1. The user identifier may be determined based on the private key and an associated public key. The intermediary device 104 in FIG. 1 may determine the user identifier based on the private key and an associated public key. An association of the command, the user identifier, and a time associated with the command may be stored as part of a history associated with the domain name system. The intermediary device 104 in FIG. 1 may store an association of the command, the user identifier, and a time associated with the command as part of a history associated with the domain name system in data store 108 in FIG. 1.

A DNS system may comprise a plurality of DNS servers. A user of the DNS system may interact with the DNS system through a web portal. The web portal may provide a user interface to a user device. The user may provide a user identifier to the DNS system via the web port. The DNS system may use the provided user identifier to determine which records the user may access and what permissions the user has associated with those accessible records. The user may be able to add metadata tags to any record associated with a URL that comprises ".com". As another example, the user may have read, write, and delete permissions for any record associated with a URL that does not comprise ".com". The DNS system may receive a command associated with a portion of the DNS system and determine if the command is consistent with what the user is determined to be able to do based on the user identifier. Additionally or alternatively, the DNS system may provide the user interface with command options for user selection based on what the user is determined to be able to do based on the user identifier and receive the command based on the user's selection. If the user is determined to have permission to issue the command, then the DNS system may determine an appropriate DNS server for the command. The DNS system may place the command in a queue. Commands in the queue may be sent to appropriate DNS servers at a predetermined rate. The appropriate DNS server may execute the command.

Figure 6:
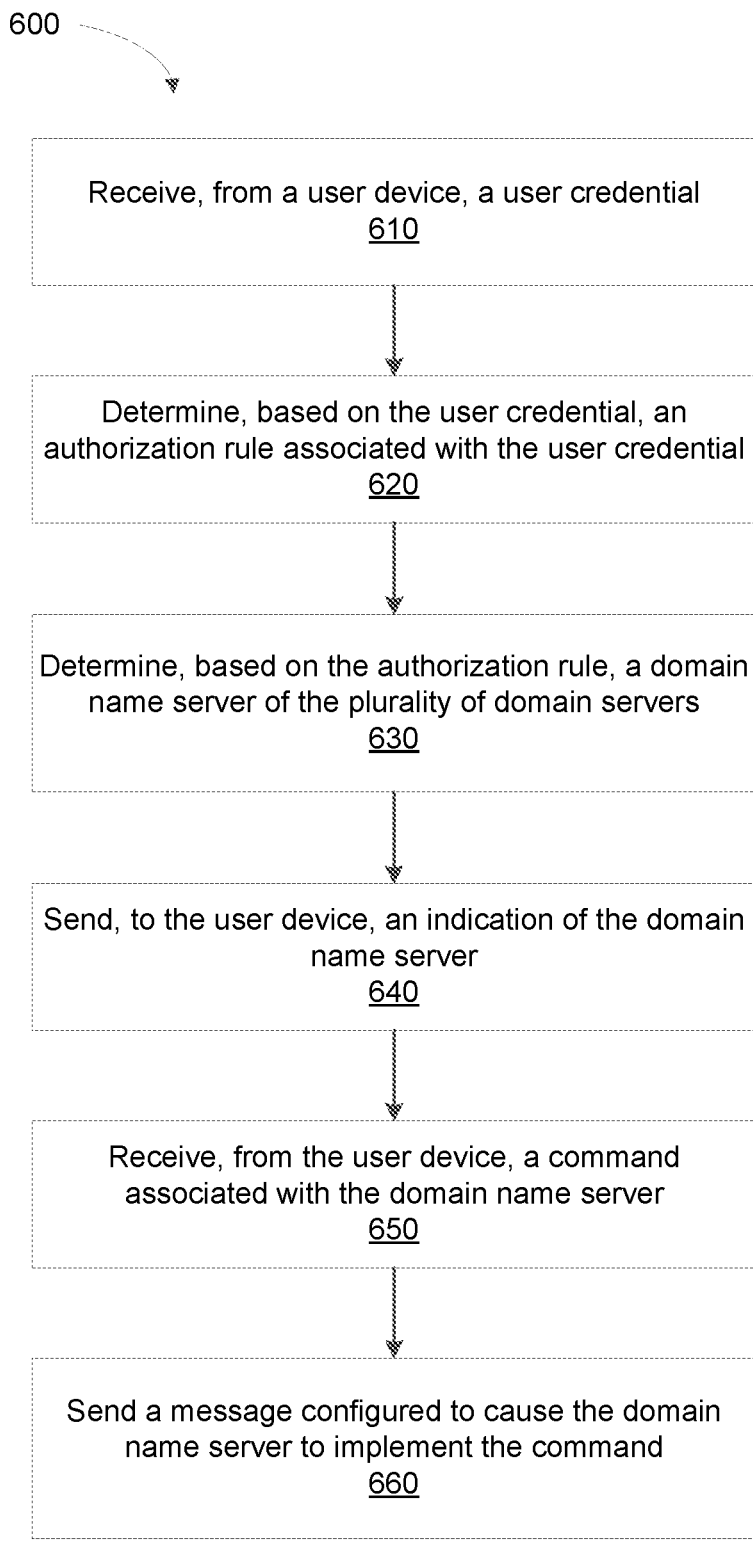
FIG. 6 is a flow diagram of an example method.

FIG. 6 is a flow diagram of an example method 600 for managing DNS records. A user credential may be received from a user device at step 610. The intermediary device 104 in FIG. 1 may receive a user credential from user device 102 in FIG. 1. At step 620, an authorization rule associated with the user credential may be determined based on the user credential. The intermediary device 104 in FIG. 1 may determine an authorization rule associated with the user credential based on the user credential. The authorization rule may associate a user identifier specific to a user and data indicative of one or more of a plurality of domain servers. At step 630, a domain name server of the plurality of domain servers may be determined based on the authorization rule. The intermediary device 104 in FIG. 1 may determine a DNS server of the one or more DNS servers 110*a*,*b*,*c* in FIG. 1 based on the authorization rule. At step 640, an indication of the domain name server may be sent to the user device. The intermediary device 104 in FIG. 1 may send an indication of DNS server to user device 102 in FIG. 1. At step 650, a command associated with the domain name server may be received from the user device. The intermediary device 104 in FIG. 1 may receive a command associated with the DNS server from user device 102 in FIG. 1. At step 660, a message configured to cause the domain name server to implement the command may be sent. The intermediary device 104 in FIG. 1 and/or balancing device 106 in FIG. 1 may send a message configured to cause the DNS server to implement the command to the DNS server.

A DNS system may receive a user credential from a user device via a web portal. The DNS system may determine an authorization rule for the user based on the user credential. The authorization rule may dictate which DNS servers the user is permitted to access and what permissions the user has on each accessible DNS server. The DNS system may cause information associated with the authorization rule, such as possible DNS servers accessible and permissions associated with each accessible DNS server, to be displayed on a user interface run by the user device. The user device may send a command in accordance with the authorization rule to the DNS system. The DNS system may implement instructions indicated by the command.

Figure 7:
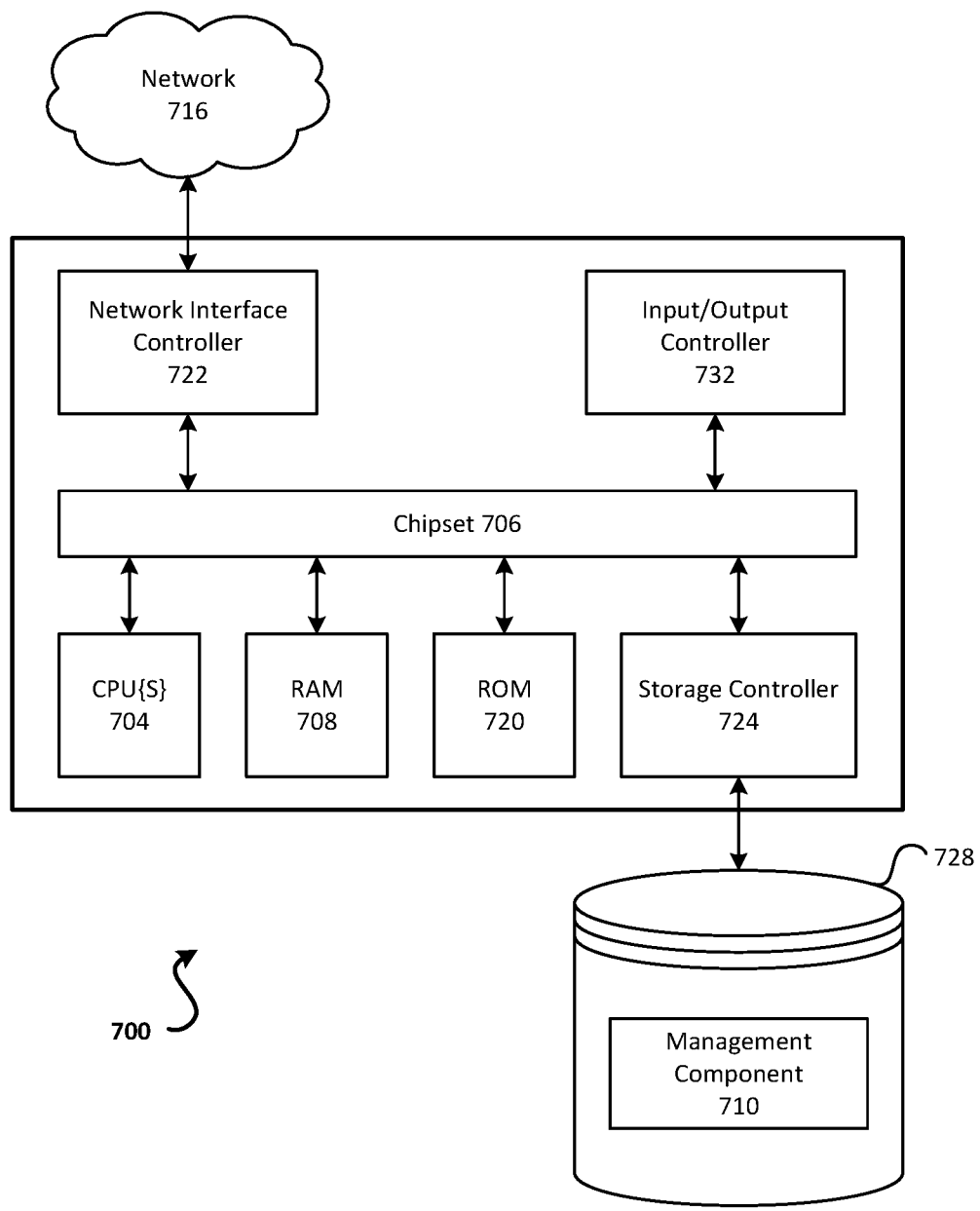
FIG. 7 is a block diagram of an example computing system.

FIG. 7 shows an example computer architecture for a computing system 700 capable of executing software for performing operations as described above in connection with FIGS. 1-6. It will be appreciated that the described processes may be performed by any suitable system components including by discrete computing systems that communicate over a communications link. The computer architecture shown in FIG. 7 shows a conventional server computer, workstation, desktop computer, laptop, tablet, network appliance, PDA, e-reader, digital cellular phone, or other computing node, and may be utilized to execute any aspects of the software components presented herein.

The computer 700 may include a baseboard, or "motherboard," which is a printed circuit board to which a multitude of components or devices may be connected by way of a system bus or other electrical communication paths. One or more central processing units (CPUs) 704 may operate in conjunction with a chipset 706. CPUs 704 may be standard programmable processors that perform arithmetic and logical operations necessary for the operation of computer 700.

The CPUs 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The chipset 706 may provide an interface between CPUs 704 and the remainder of the components and devices on the baseboard. Chipset 706 may provide an interface to a random access memory (RAM) 708 used as the main memory in computer 700. Chipset 706 may provide an interface to a computer-readable storage medium, such as a read-only memory (ROM) 720 or non-volatile RAM (NVRAM) (not shown), for storing basic routines that may help to start up computer 700 and to transfer information between the various components and devices. ROM 720 or NVRAM may also store other software components necessary for the operation of computer 700 in accordance with the embodiments described herein.

The computer 700 may operate in a networked environment using logical connections to remote computing nodes and computer systems through LAN 716. Chipset 706 may include functionality for providing network connectivity through a network interface controller (NIC) 722, such as a gigabit Ethernet adapter. NIC 722 may be capable of connecting the computer 700 to other computing nodes over LAN 716. It should be appreciated that multiple NICs 722 may be present in computer 700, connecting the computer to other types of networks and remote computer systems.

The computer 700 may be connected to a mass storage device 728 that provides non-volatile storage for the computer. The mass storage device 728 may store system programs, application programs, other program modules, and data, which have been described in greater detail herein. The mass storage device 728 may be connected to computer 700 through a storage controller 724 connected to chipset 706. The mass storage device 728 may comprise of one or more physical storage units. The storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 700 may store data on the mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 728 is characterized as primary or secondary storage and the like.

The computer 700 may store information to the mass storage device 728 by issuing instructions through the storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may read information from the mass storage device 728 by detecting the physical states or characteristics of one or more particular locations within the physical storage units.

The computer 700 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 700.

The Computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

The mass storage device 728 may store an operating system utilized to control the operation of the computer 700. According to one embodiment, the operating system comprises a version of the LINUX operating system. According to another embodiment, the operating system comprises a version of the WINDOWS SERVER operating system from the MICROSOFT Corporation. The operating system may comprise a version of the UNIX operating system. It should be appreciated that other operating systems may also be utilized. The mass storage device 728 may store other system or application programs and data utilized by the computer 700, such as the management component 710 and/or the other software components described above. The management component 710 may be configured to implement the disclosure described herein.

The mass storage device 728 or other computer-readable storage media may also be encoded with computer-executable instructions, which, when loaded into the computer 700, transforms the computer from a general-purpose computing system into a special-purpose computer capable of implementing the embodiments described herein. These computer-executable instructions transform the computer 700 by specifying how CPUs 704 transition between states, as described above. The computer 700 may have access to computer-readable storage media storing computer-executable instructions, which, when executed by the computer 700, may perform operating procedures described above in connection with FIGS. 2-6.

The computer 700 may also include an input/output controller 732 for receiving and processing input from a number of input devices, such as a keyboard, a mouse, a touchpad, a touch screen, an electronic stylus, or other type of input device. Similarly, the input/output controller 732 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may also be practiced in distributed computing environments, where tasks are performed by remote processing devices that are linked through a communications network.

In a distributed computing environment, program modules may be located in both local and remote memory storage devices.

It will be appreciated that while illustrative embodiments have been disclosed, the scope of potential embodiments is not limited to those explicitly described. While the concepts are described with reference to requests received to perform particular types of functions or commands, the envisioned embodiments extend to processing involving any and all types of functions and commands. Similarly, while the concepts are described with reference to particular protocols and formats, the envisioned embodiments extend to processing involving any and all types of protocols and formats.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition or in the alternative, certain method or process blocks may be omitted in some implementations. The methods and processes described herein are also not limited to any particular sequence, and the blocks or states relating thereto can be performed in other sequences that are appropriate. The described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. The elements may be added to, removed from or rearranged compared to the disclosed example embodiments.

It will also be appreciated that various items are shown as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the computing systems via inter-computer communication. In some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection.

The systems, modules, and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the features described herein may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the disclosure described herein may be embodied in a variety of other forms; furthermore, various omissions, substitutions, and changes in the form of the disclosure described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method comprising:
receiving, from a user device associated with a user identifier, a command associated with a domain name system comprising a plurality of domain name servers;
determining, based on the user identifier, an authorization rule, wherein the authorization rule associates the user identifier with a permission level and data indicative of one or more of the plurality of domain name servers;
authorizing, based on the authorization rule, the command;
determining, based on one or more of the authorization rule or the command, a domain name server of the plurality of domain name servers; and
sending a message configured to cause the domain name server to implement the command.

2. The method of claim 1, wherein the authorization rule associates the user identifier with a domain record characteristic.

3. The method of claim 2, wherein the domain record characteristic comprises one or more of a type of a domain record, a domain label, a domain name, an internet protocol address range, or a metadata tag.

4. The method of claim 2, wherein the authorization rule comprises one or more characters indicative of the domain record characteristic, and wherein authorizing, based on the authorization rule, the command comprises determining that a domain record specified by the command satisfies a matching criterion applied to the one or more characters.

5. The method of claim 1, further comprising receiving, from the user device, a private key assigned to a user of the user device, and further comprising determining, based on the private key and an associated public key, the user identifier.

6. The method of claim 1, wherein the user identifier comprises a private key associated with a user, and further comprising authenticating, based on the private key and a public key associated with the user, one or more of the command or the user device.

7. The method of claim 1, wherein sending the message configured to cause the domain name server to implement the command comprises:
   causing one or more of the command or the message to be inserted into a queue; and
   sending, from the queue to the domain name server and based on a processing rate associated with the domain name server, the message.

8. A method comprising:
   receiving, from a user device associated with a user identifier, a command associated with a domain name system;
   determining, based on the user identifier, an authorization rule, wherein the authorization rule associates the user identifier with a permission level and a domain record characteristic;
   authorizing, based on the authorization rule, the command;
   generating, based on the authorization, a message configured to cause implementation of the command; and
   sending, to one or more devices of the domain name system, the message.

9. The method of claim 8, wherein the domain record characteristic comprises one or more of a type of a domain record, a domain label, a domain name, an internet protocol address range, or a metadata tag.

10. The method of claim 8, wherein the authorization rule comprises one or more characters indicative of the domain record characteristic, and wherein authorizing, based on the authorization rule, the command comprises determining that a domain record specified by the command satisfies a matching criterion applied to the one or more characters.

11. The method of claim 10, wherein the matching criterion specifies matching of the one or more characters to one or more of a domain name zone, a domain name record, a domain label, an internet protocol address range, or a metadata tag.

12. The method of claim 8, further comprising storing an association of the command, the user identifier, and a time associated with the command as part of a history associated with the domain name system.

13. The method of claim 8, wherein the command comprises an update to a domain name record.

14. The method of claim 8, wherein sending the message comprises sending, based on a domain name server protocol, the message.

15. A method comprising:
   determining a plurality of domain name servers in a domain name system;
   determining a user identifier for a user of the domain name system;
   associating, via an authorization rule, the user identifier with a permission level and a domain record characteristic;
   receiving, from a user device, a command associated with at least a portion of the domain name system;
   authorizing, based on the authorization rule, the command;
   determining, based on one or more of the command or the authorization rule, a domain name server of the plurality of domain name servers; and
   sending a message configured to cause the domain name server to implement the command.

16. The method of claim 15, wherein the permission level comprises a file system privilege level, wherein the file system privilege level comprises one of a read privilege, a write privilege, a delete privilege, or a combination thereof.

17. The method of claim 15, wherein the domain record characteristic comprises one or more of a type of a domain record, a domain label, a domain name, an internet protocol address range, or a metadata tag.

18. The method of claim 15, wherein the authorization rule comprises one or more characters indicative of the domain record characteristic, and wherein authorizing, based on the authorization rule, the command comprises determining that a domain record specified by the command satisfies a matching criterion applied to the one or more characters.

19. The method of claim 18, wherein the matching criterion specifies matching of the one or more characters to one or more of a domain name zone, a domain name record, a domain label, an internet protocol address range, or a metadata tag.

20. The method of claim 15, wherein the plurality of domain name servers comprise a first domain server associated with a first domain name server package and a second domain server associated with a second domain name server package different from the first domain name server package, and wherein the first domain server is configured to store data in a data store and the second domain server is configured to store data in the data store.

* * * * *